(12) United States Patent
Chiang

(10) Patent No.: US 8,238,734 B2
(45) Date of Patent: Aug. 7, 2012

(54) IMAGE CAPTURING UNIT AND ELECTRONIC DEVICE HAVING SAME

(75) Inventor: Shun-Fan Chiang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 141 days.

(21) Appl. No.: 12/764,106

(22) Filed: Apr. 21, 2010

(65) Prior Publication Data

US 2011/0158625 A1 Jun. 30, 2011

(30) Foreign Application Priority Data

Dec. 30, 2009 (CN) .......................... 2009 1 0312792

(51) Int. Cl.
*G03B 37/02* (2006.01)
(52) U.S. Cl. ........... 396/20; 396/133; 348/340; 348/374
(58) Field of Classification Search .................. 396/133, 396/427, 428, 20; 348/169, 373, 375
See application file for complete search history.

(56) References Cited

U.S. PATENT DOCUMENTS

| | | | |
|---|---|---|---|
| 2002/0096956 A1* | 7/2002 | Erten | 310/156.01 |
| 2010/0098394 A1* | 4/2010 | Ishihara et al. | 396/55 |
| 2010/0329654 A1* | 12/2010 | Chiang | 396/133 |
| 2011/0150441 A1* | 6/2011 | Ollila et al. | 396/133 |

* cited by examiner

*Primary Examiner* — Clayton E LaBalle
*Assistant Examiner* — Leon W Rhodes, Jr.
(74) *Attorney, Agent, or Firm* — Altis Law Group, Inc.

(57) ABSTRACT

An exemplary image capturing unit includes a housing, a moveable support, and a driving assembly. The moveable support is moveably mounted in the housing. The moveable support includes a rotating axis and is configured for receiving a camera module. The driving assembly includes a first magnetic member and a second magnetic member. The first magnetic member is positioned on the housing. The second magnetic member is positioned on the moveable support and faces the first magnetic member. The driving assembly is configured for driving the moveable support to rotate about the rotating axis relative to the housing through magnetical interaction between the first magnetic member and the second magnetic member.

16 Claims, 6 Drawing Sheets

IMAGE CAPTURING UNIT AND ELECTRONIC DEVICE HAVING SAME

BACKGROUND

1. Technical Field

The present disclosure relates to image capturing units and electronic devices having the same.

2. Description of Related Art

Electronic devices, such as digital cameras, cell phones, etc. include image capturing units. The image capturing unit may include a wide-angle lens module for capturing a wide-angle view. However, the wide-angle lens module generally includes aspherical lenses to achieve the wide-angle function. The aspherical lenses are hard to make, which increases manufacturing cost of the image capturing unit and the electronic device.

Therefore, an image capturing unit and an electronic device having the same, which can overcome the above-mentioned problems, are needed.

DETAILED DESCRIPTION

Figure 1:
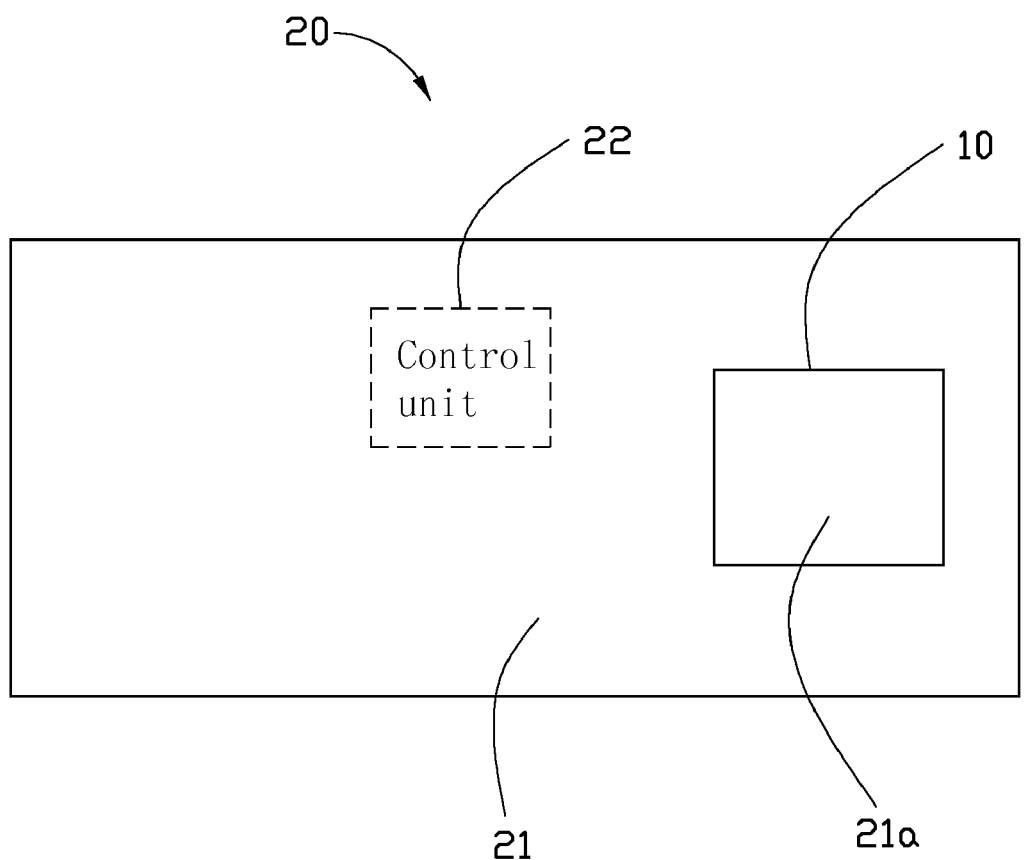
FIG. 1 is a schematic view of an electronic device including an image capturing unit, according to an exemplary embodiment.
Figure 2:
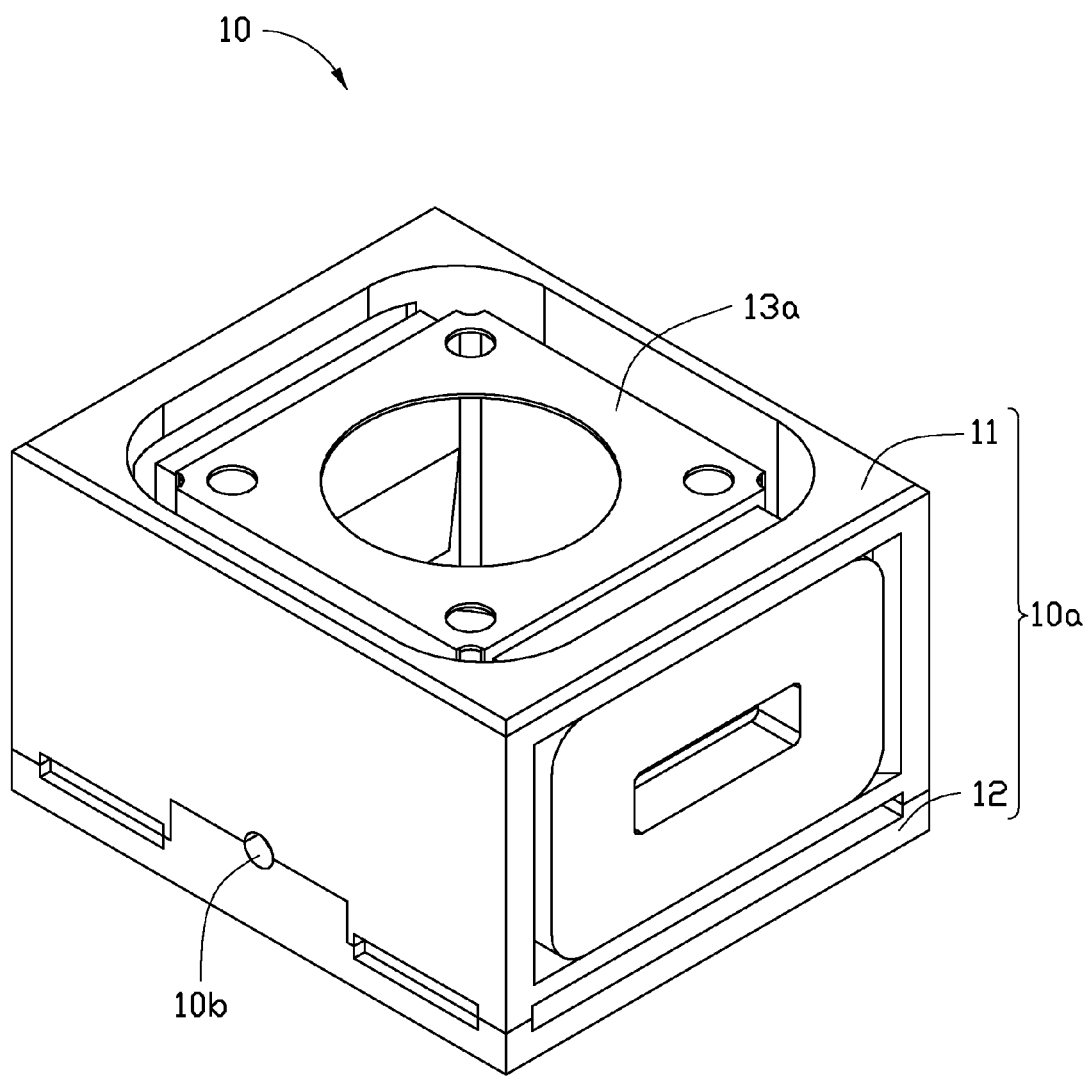
FIG. 2 is an isometric and schematic view of the image capturing unit of FIG. 1.

Referring to FIG. 1, an electronic device 20, according to an exemplary embodiment, includes a body 21, an image capturing unit 10 mounted inside the body 21 and a control unit 22. The electronic device 20 may be a digital camera or a cell phone.

The body 21 defines a through hole 21a to allow light to enter the image capturing unit 10. The control unit 22 is configured for controlling the image capturing unit 10.

Referring to FIGS. 2-5, the image capturing unit 10 includes a housing 10a, a moveable support 13a, and a driving assembly 17.

The housing 10a may be fixed inside the body 21. The housing 10a is substantially cuboid-shaped and includes a cover 11 and a base 12 mounted to the cover 11. The cover 11 includes a first sidewall 111, a second side wall 112, a third sidewall 113, a fourth sidewall 114 and an upper sidewall 115. The first, second, third and fourth sidewalls (111, 112, 113, and 114) are connected perpendicularly end to end in that order and cooperatively define a first receiving space 110. The upper sidewall 115 connects perpendicularly to the first, second, third and fourth sidewalls (111, 112, 113, and 114) and defines an upper through hole 116 communicating with the first receiving space 110.

The first sidewall 111 defines a first receiving hole 1120, and the third sidewall 113 defines a second receiving hole 1130. The first and second receiving holes 1120 and 1130 are aligned with each other and are in communication with the first receiving space 110. The second sidewall 112 defines a first receiving groove 112a at a middle of a distal end thereof. The fourth sidewall 114 defines a second receiving groove 114a at a middle of a distal end thereof. The first receiving groove 112a includes a first sub-groove 112b at a top thereof (see FIG. 4). The second receiving groove 114a includes a second sub-groove 114b at a top thereof (see FIG. 3). The sub-grooves 112b and 114b are substantially arc-shaped.

Figure 4:
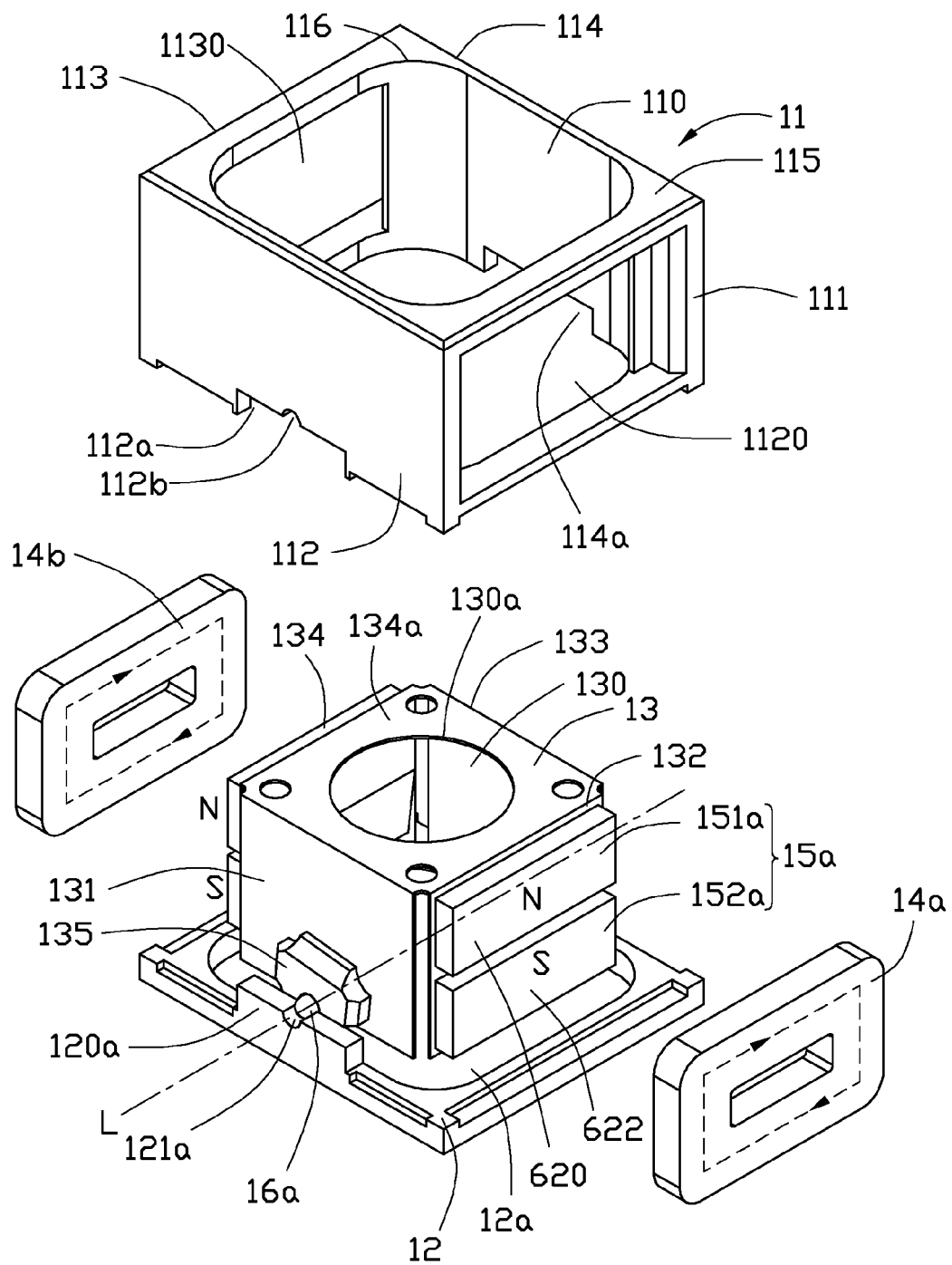
FIG. 4 is similar to FIG. 3, but viewing the image capturing unit from another angle.
Figure 5:
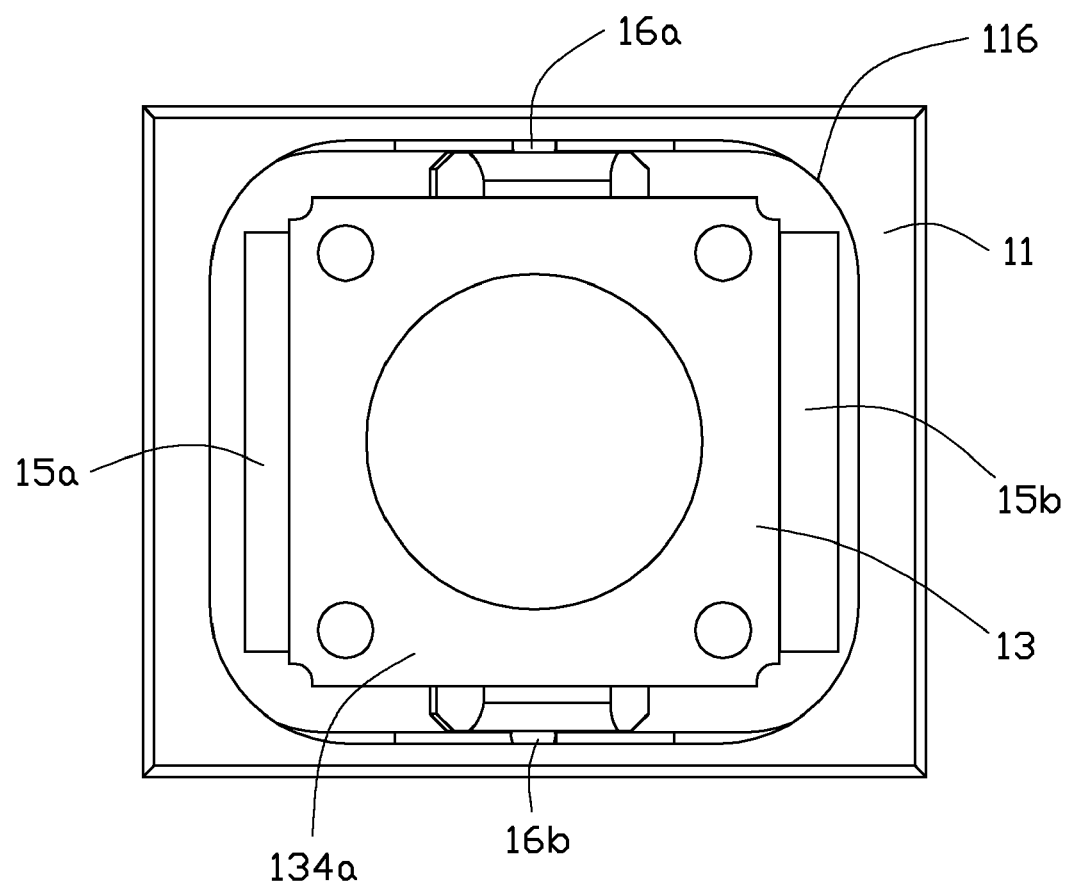
FIG. 5 is a planar view of the image capturing unit of FIG. 2.

The base 12 defines a lower through hole 12a at a center thereof (see FIG. 4). An area of the lower through hole 12a is greater than that of an orthogonal projection of the moveable support 13a on the lower through hole 12a. The housing 10a further includes two supports 120a and 120b (hereinafter the first support 120a and the second support 120b) extending from two opposite sides of the base 12 towards the cover 11. The first support 120a defines a first supporting groove 121a at a top thereof. The second support 120b defines a second supporting groove 121b at a top thereof. The first and second supporting grooves 121a and 121b are substantially shaped the same as the first and second sub-grooves 112b and 114b. When the cover 11 mounts to the base 12, the first support 120a is fitly received into the first receiving groove 112a and the second support 120b is fitly received in the second receiving groove 114a. The first supporting groove 121a and the first sub-groove 112b cooperatively form a first supporting hole 10b (see FIG. 2). The second supporting groove 121b and the second sub-groove 114b cooperatively form a second supporting hole (invisible in FIG. 2).

The moveable support 13a is rotatably received in the first receiving space 110. The moveable support 13a includes a main frame 13, two supporting arms 135 and 136 (hereinafter the first supporting arm 135, and the second supporting arm 136), and two rolling balls 16a and 16b (hereinafter the first rolling ball 16a, and the second rolling ball 16b).

The main frame 13 includes a first outer surface 131, a second outer surface 132, a third outer surface 133, a fourth outer surface 134, and an upper outer surface 134a. The first, second, third and fourth outer surfaces (131, 132, 133, and 134) are connected perpendicularly end to end in that order and cooperatively define a second receiving space 130. The second receiving space 130 is configured for receiving a camera module (not shown). The camera module may include a lens module and an image sensor and/or an auto-focus mechanism. The auto-focus mechanism is configured for driving the lens module to focus lights into the image sensor. The upper outer surface 134a connects sides of the first, second, third and fourth outer surfaces (131, 132, 133, and 134). The upper outer surface 134a defines a frame through hole 130a aligned with the upper through hole 116. An area of the upper though hole 116 is greater than that of the upper outer surface 134a (see FIG. 5).

The first supporting arm 135 is fixedly mounted on the first outer surface 131 corresponding to the first support 120a. The second supporting arm 136 is fixedly mounted on the third outer surface 133 corresponding to the second support 120b. The first rolling ball 16a is partially received in the first supporting arm 135 and is supported on the first supporting groove 121a. The second rolling ball 16b is partially received in the second supporting arm 136 and is supported on the second supporting groove 121b. Therefore, the main frame 13 is rotatably supported on the base 12 by the supporting arms 135 and 136 and the rolling balls 16a and 16b. The main frame 13 together with the supporting arms 135 and 136 can rotate about an axis L passing through centers of the two rolling balls 16a and 16b.

The driving assembly 17 includes a first magnetic member 14 positioned on the cover 11 of the housing 10a and a second magnetic member 15 positioned on the main frame 13 of the moveable support 13a. The first magnetic member 14 faces the second magnetic member 15. The driving assembly 17 is configured for driving the moveable support 13a to rotate about the axis L relative to the housing 10a through magnetic interaction between the first magnetic member 14 and the second magnetic member 15.

In detail, the first magnetic member 14 includes a first coil 14a, and a second coil 14b. Each coil is substantially a rectangular ring and is fixedly received in a corresponding receiving hole. That is, the first coil 14a is fixedly received in the first receiving hole 1120. The second coil 14b is fixedly received in the second receiving hole 1130.

The second magnetic member 15 includes a first magnet unit 15a, and a second magnet unit 15b. Each magnet unit is positioned on a corresponding outer surface and faces a corresponding coil to interact with the corresponding coil. That is, the first magnet unit 15a is positioned on the second outer surface 132 and faces the first coil 14a. The second magnet unit 15b is positioned on the fourth outer surface 134 and faces the second coil 14b.

Figure 3:
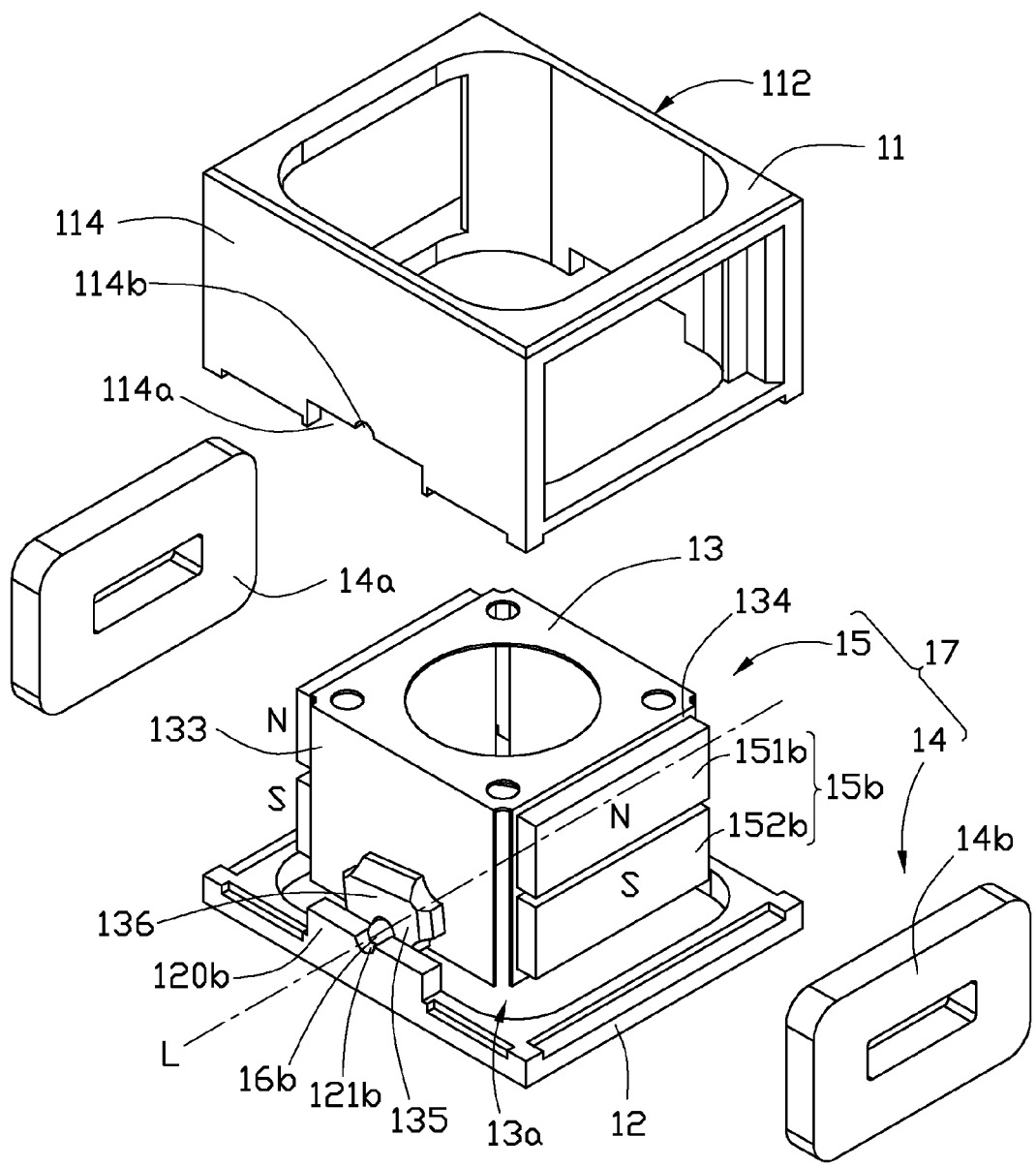
FIG. 3 is a partially dissembled view of the image capturing unit of FIG. 2.

Each magnet unit includes an upper magnet and a lower magnet. A magnetic pole of the upper magnet facing a corresponding coil is opposite to a magnetic pole of the lower magnet facing the corresponding coil. For example, the first magnet unit 15a includes an upper magnet 151a and a lower magnet 152a. A first magnetic pole 620 of the upper magnet 151a facing the first coil 14a is opposite to a second magnetic pole 622 of the lower magnet 152a facing the first coil 14a. In this embodiment, the first magnetic pole is magnetic north, and the second magnetic pole is magnetic south, as shown in FIGS. 3 and 4.

Figure 6:
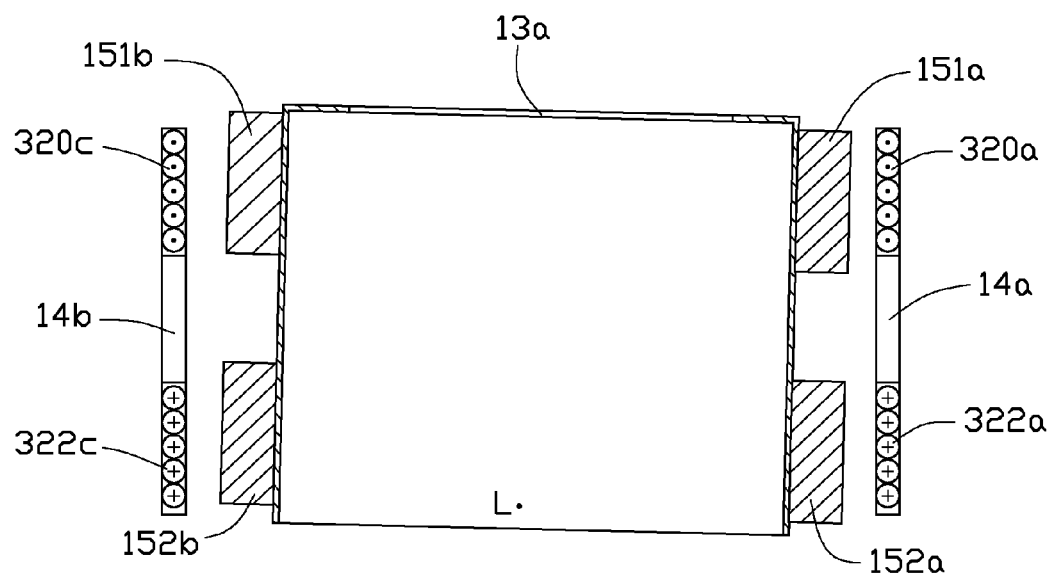
FIG. 6 is a schematic view of a working principle of the image capturing unit of FIG. 2.

Referring to FIG. 6, dots shown in the coils represents that a current in the coils goes perpendicularly towards the paper, and crosses shown in the coils represents that the current in the coils goes perpendicularly away from the paper. When in use, for example, the control unit 22 applies currents to the first coil 14a and the second coil 14b shown as ring-shaped broken lines with arrows in the coils 14a and 14b in FIG. 4. Therefore, the first coil 14a and the second coil 14b generate magnetic fields. Accordingly, an attractive force is applied to the upper magnet 151a by an upper lengthwise side 320a of the first coil 14a, and a repellent force is applied to the lower magnet 152a by the lower lengthwise side 322a of the first coil 14a. Similarly, a repellent force is applied to the upper magnet 151b by an upper lengthwise side 320c of the second coil 14b, and an attractive force is applied to the lower magnet 152b by the lower lengthwise side 322c of the second coil 14b. Therefore, a clockwise torque force about the axis L is applied to the moveable frame 13a and the moveable frame 13a is driven to rotate clockwise about the axis L. A capturing view of the camera module received in the main frame 13 can be changed. A wide-angle capturing of the image capturing unit 10 can be achieved.

It is to be understood that in alternative embodiments, the first magnetic pole may be magnetic south, and the second magnetic pole may be magnetic north. Directions of currents applied to the coils 14a and 14b may be changed accordingly. The first magnetic member may include a plurality of magnet units and the second magnetic member may include a plurality of coils.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An image capturing unit, comprising:
a housing;
a moveable support moveably mounted in the housing, the moveable support comprising a rotating axis and configured for receiving a camera module, the moveable support comprising a main frame, two supporting arms, and two rolling balls, the main frame comprising a first outer surface, a second outer surface, a third outer surface, a fourth outer surface, and an upper outer surface, the first, second, third and fourth outer surfaces being connected perpendicularly end to end in that order and cooperatively defining a second receiving space configured for receiving the camera module, the two supporting arms being fixedly mounted to the first outer surface and the third outer surface respectively, the two rolling balls being partially received in the two supporting arms respectively; and
a driving assembly comprising a first magnetic member and a second magnetic member, the first magnetic member positioned on the housing, the second magnetic member positioned on the moveable support and facing the first magnetic member, the driving assembly configured for driving the moveable support to rotate about the rotating axis relative to the housing through magnetic interaction between the first magnetic member and the second magnetic member.

2. The image capturing unit of claim 1, wherein the housing comprises a cover and a base mounted to the cover, and the base rotatably supports the moveable support.

3. The image capturing unit of claim 2, wherein the cover comprises a first sidewall, a second side wall, a third sidewall, a fourth sidewall and an upper sidewall, the first, second, third and fourth sidewalls being connected perpendicularly end to end in that order and cooperatively defining a first receiving space, the upper sidewall connecting perpendicularly the first, second, third and fourth sidewalls and defining an upper through hole communicating with the first receiving space.

4. The image capturing unit of claim 3, wherein the first sidewall defines a first receiving hole, the third sidewall defines a second receiving hole, and the first magnetic member comprises two electromagnets received in the two receiving holes respectively.

5. The image capturing unit of claim 4, wherein the second magnetic member comprises two magnet units each positioned on a corresponding outer surface and facing a corresponding electromagnet.

6. The image capturing unit of claim 5, wherein each magnet unit comprises an upper magnet and a lower magnet, a magnetic pole of the upper magnet facing a corresponding electromagnet being opposite to a magnetic pole of the lower magnet facing the corresponding electromagnet.

7. The image capturing unit of claim 1, wherein the second magnetic member is positioned on the second outer surface and the fourth outer surface.

8. The image capturing unit of claim 1, wherein the rotating axis passes through centers of the two rolling balls.

9. An electronic device, comprising:
a body defining a through hole;
an image capturing unit mounted inside the body and configured for receiving light passing through the through hole, the image capturing unit comprising:
a housing;
a moveable support moveably mounted in the housing, the moveable support comprising a rotating axis and configured for receiving a camera module, the moveable support comprising a main frame, two supporting arms, and two rolling balls, the main frame comprising a first outer surface, a second outer surface, a third outer surface, a fourth outer surface, and an upper outer surface, the first, second, third and fourth outer surfaces being connected perpendicularly end to end in that order and cooperatively defining a second receiving space configured for receiving the camera module, the two supporting arms being fixedly mounted to the first outer surface and the third outer surface respectively, the two rolling balls being partially received in the two supporting arms respectively; and a driving assembly comprising a first magnetic member and a second magnetic member, the first magnetic member positioned on the housing, the second magnetic member positioned on the moveable support and facing the first magnetic member, the driving assembly configured for driving the moveable support to rotate about the rotating axis relative to the housing through magnetic interaction between the first magnetic member and the second magnetic member; and a control unit configured for controlling the driving assembly to drive the moveable support.

10. The electronic device of claim 9, wherein the housing comprises a cover and a base mounted to the cover, and the base rotatably supports the moveable support.

11. The electronic device of claim 10, wherein the cover comprises a first sidewall, a second side wall, a third sidewall, a fourth sidewall and an upper sidewall, the first, second, third and fourth sidewalls being connected perpendicularly end to end in that order and cooperatively defining a first receiving space, the upper sidewall connecting perpendicularly the first, second, third and fourth sidewalls and defining an upper through hole communicating with the first receiving space.

12. The electronic device of claim 11, wherein the first sidewall defines a first receiving hole, the third sidewall defines a second receiving hole, and the first magnetic member comprises two electromagnets received in the two receiving holes respectively.

13. The electronic device of claim 12, wherein the second magnetic member comprises two magnet units each positioned on a corresponding outer surface and facing a corresponding electromagnet.

14. The electronic device of claim 13, wherein each magnet unit comprises an upper magnet and a lower magnet, a magnetic pole of the upper magnet facing a corresponding electromagnet being opposite to a magnetic pole of the lower magnet facing the corresponding electromagnet.

15. The electronic device of claim 13, wherein the control unit applies currents in the electromagnets to allow the electromagnet to interact with the corresponding magnet unit.

16. The electronic device of claim 9, wherein the second magnetic member is positioned on the second outer surface and the fourth outer surface.

\* \* \* \* \*